Sept. 20, 1966  H. R. WALKER  3,273,260
AUDIO-VISUAL COMMUNICATION SYSTEMS AND METHODS
Filed Oct. 6, 1964  5 Sheets-Sheet 2

INVENTOR.
Harold R. Walker
BY
John J. Rogan
Attorney

Sept. 20, 1966  H. R. WALKER  3,273,260
AUDIO-VISUAL COMMUNICATION SYSTEMS AND METHODS
Filed Oct. 6, 1964  5 Sheets-Sheet 4
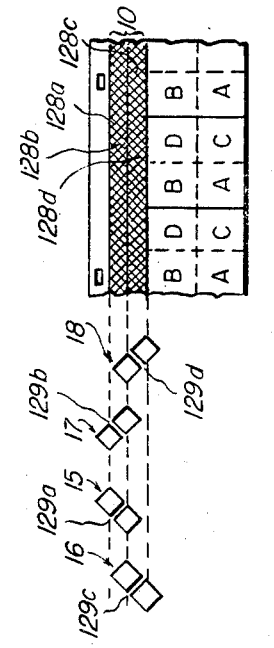
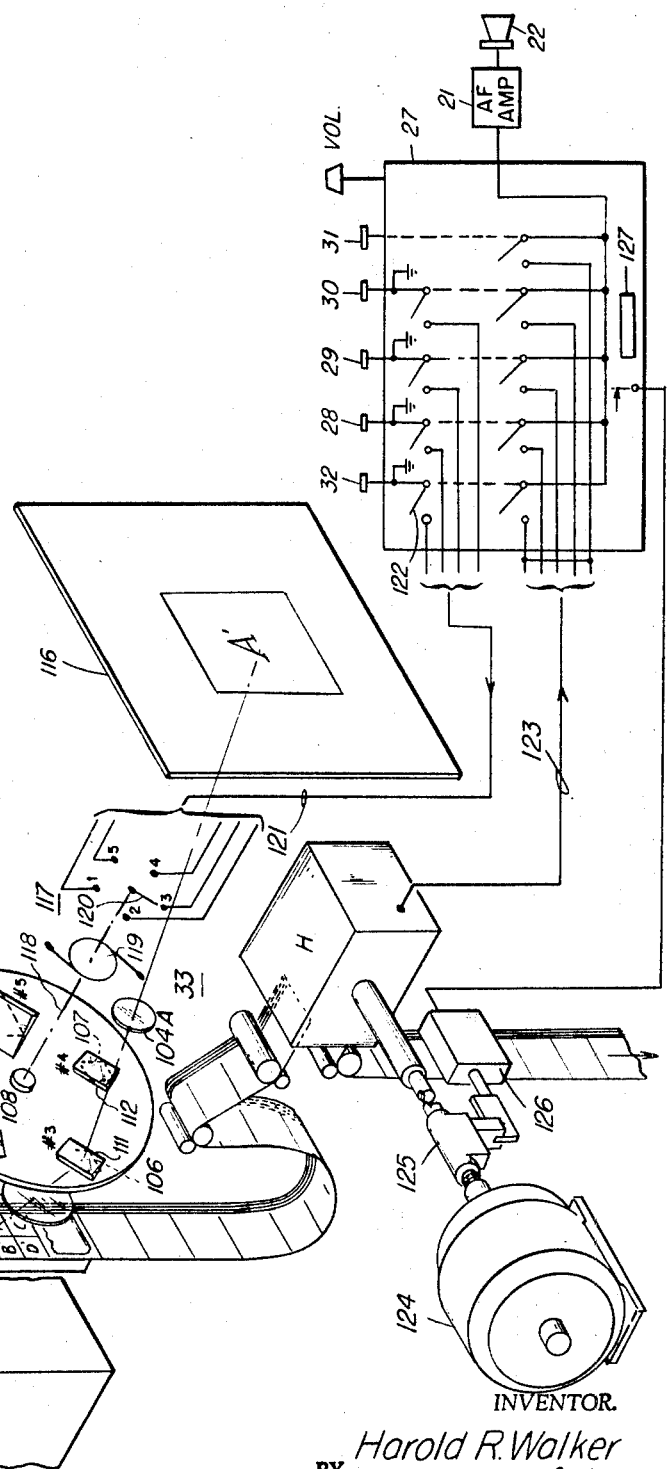
INVENTOR.
Harold R. Walker
BY John J. Rogan
Attorney

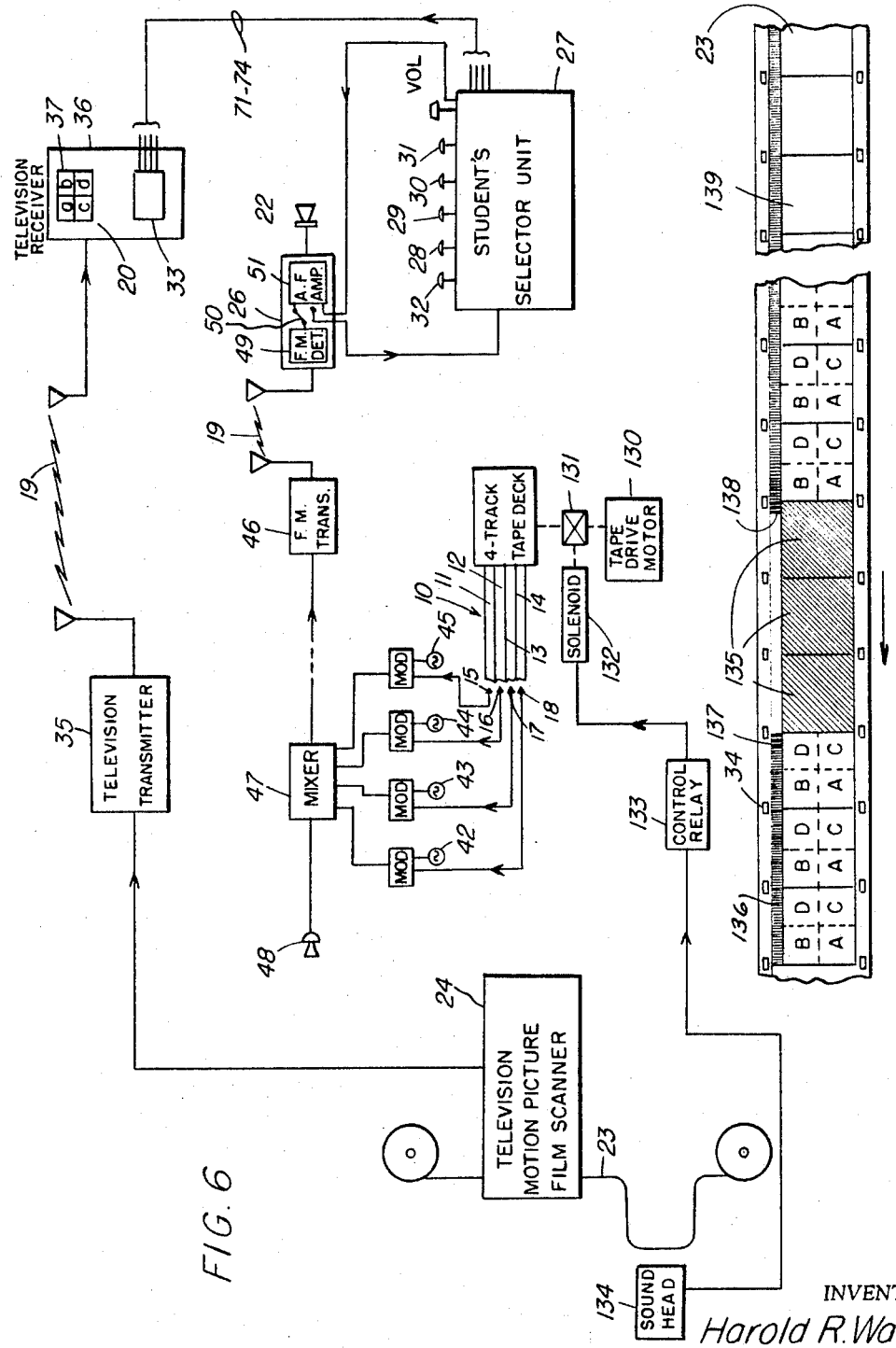

United States Patent Office 3,273,260
Patented Sept. 20, 1966

3,273,260
AUDIO-VISUAL COMMUNICATION SYSTEMS
AND METHODS
Harold R. Walker, Metuchen, N.J., assignor to Tutortape Laboratories, Inc., New York, N.Y., a corporation of New York
Filed Oct. 6, 1964, Ser. No. 401,787
13 Claims. (Cl. 35—9)

This invention relates to informational dissemination systems and more particularly it relates to audio-visual systems involving the selective retrieval and recording of information. Typical of such systems are those used to achieve self-instruction or group instruction or guidance by means of specially programmed recorded data or information.

A principal object of the invention is to provide an improved system of the kind disclosed in the co-pending application of Norman S. Livingston, Serial No. 330,142 filed December 12, 1963.

There is disclosed in said application a system wherein information is pre-recorded in programmed form on a magnetic or similar tape, with the information arranged in identifiable equal length segments and with various segments having respectively different informational and directing records. When such a system is used for student self-instruction the tape is programmed in advance with the proper segments, and the student hears the segments played back, and in each segment he is given a unit of material for consideration and choice of answer. The information in each segment is followed by a multiple choice question relating to the preceding unit of material in the segment. The student's choice of answer, by means of a multi-selecting device, determines directly and automatically what material he will hear and/or see next. If he immediately chooses the correct answer to the previously heard multi-choice unit of material, he is automatically presented with so-called educational reinforcement or reward material and is also given the next problem or unit of material to be answered. If the student's first choice represents an incorrect answer he is automatically presented with pre-recorded correctional material and is directed to make another choice of answer. If his second answer choice is incorrect he receives correctional material and including information on the correct answer. He is then instructed to operate a switching mechanism to receive the information for the next problem or situation for consideration. In other words, the student's progress proceeds with reinforced data when he chooses correct answers to questions and he is given specific remedial material should he make a wrong choice of answer. To achieve this arrangement the questions are placed in the multiple-choice format. The choice of the student's answer to a multiple-choice question can be represented by a physical act, such as pushing one of a series of selector buttons which brings the appropriate played-back material for listening.

According to said application, the audible play-back mechanism to which the student listens is also accompanied by a picture projector which simultaneously projects a still picture to accompany the information played back from the various segments of the tape. However, such accompaniment according to the said application is in the form of still pictures. While, therefore, the student has the advantage of the live voice personality of the instructor who made the original tape recordings, he is not fully able to appreciate the visual personality of the instructor. This, of course, is of importance in those fields of instruction where visible manipulations of movements or the like are necessary for the proper instruction.

The present invention therefore has for one of its principal objects to provide an automatic instructing system whereby a student can, each time he makes a multiple-choice answer selection, not only hear the instructor, but can visually see his actions and even personal mannerisms which in many cases, help to fix, or at least more greatly impress, the correct information in the student's mind. The result is therefore a very close approximation to living classroom or private tutoring.

While the invention is concerned primarily with tutorial or instructional uses, it will be understood that it is capable of use for entertainment, opinion sampling, or any other use requiring a person to make one of a multiple-choice of data or informational units derived from a pre-programmed recording, and also informing or confirming to such person whether his choice is correct or whether it is incorrect.

Accordingly, another principal object of the invention is to provide a system and organization of apparatus capable of meeting the instructional and/or entertainment requirements of a single individual or of a large segment of the population, either by means of local transmission of the instructional or entertainment material from a pre-programmed tape, or by means of an eelctrical transmission link of any known kind.

Another object is to provide a novel and improved informational or data record such as a preprogrammed web or film which carries plural-track sound data and its accompanying plural-channel visual display, both of which are coded or keyed to a selective mechanism to be operated by a student, subscriber, or the like, whereby such person can, by means of both audible presentation and motion picture presentation acquire correct information, and at the same time can automatically check the correctness of a multiple answer choice.

Another object is to provide a self-tutoring system or organization of apparatus employing a novel coded arrangement of audible information and accompanying motion picture informational display on a novel record web or tape. The tape carries the audible information in a series of pre-recorded segments in a plurality of sound tracks, and the visual information is recorded in a series of plural-sector motion picture frames. The corresponding segments in the successive frames provide a continuous motion picture display which is correlated with a corresponding sound track.

Another object is to provide a programmed master record in the form of a web or tape having a series of sound tracks and accompanying motion picture frames with each frame divided into a series of sectors equal in number to said tracks, and with manually operable selector means to enable a person or student to select a particular track for audible reproduction and also to select simultaneously the proper sector in the successive motion picture frames so as to reproduce continuous animated display correlated with the chosen sound track.

A feature of the invention relates to a novel audio-visual display system comprising a viewing screen divided in sectors each of which is arranged to receive a respective animated display, in conjunction with a sector selector arrangement, a sound reproducing arrangement, and also including a composite motion picture film with accompanying plural track sound records, and in conjunction with a selector device whereby a person can select for projection any desired animated display from said motion picture web and also simultaneously select the correct audible program to accompany said selected display.

In accordance with this last mentioned feature, each frame of the motion picture web or film is divided into a set of sectors with corresponding sectors in the successive frames producing a particlar continuous animated display, and the web is provided with a number of discrete sound tracks and respective pick-up heads equal in number to the number of said tracks. By means of a series of selector switches, a person can automatically reproduce a selected visual motion picture display and the proper sound record correlated therewith.

Another feature relates to a novel audio-visual display system employing a plural-track sound record and a correlated motion picture film wherein each frame of the film is divided into equal sectors; in conjunction with a novel sector selector arrangement whereby a person can readily select for viewing any desired animated display while simultaneously selecting the proper sound track for playback correlated with the selected animated visual display.

Another feature relates to a novel audio-visual display system employing a cathode ray tube television receiver in conjunction with means to receive in discrete channels, television signals representing respective animated displays each of which is arranged to be displayed on a respective sector of the cathode ray tube viewing screen; and also selecting means are provided for blanking off all sectors of the screen except a particular one which is correlated with a corresponding received audio program.

A further feature relates to a combined audio-visual reproducing system wherein a number of original discrete animated visual displays and accompanying audio programs are transmitted as respective electric signals, and are received in separate picture and sound channels. The received picture signals are applied to a television receiver having associated therewith a selecting arrangement whereby any desired sector of the picture tube screen can be selected for visual reproduction of a corresponding one of the received visual programs, while simultaneously reproducing the correlated accompanying audio program.

A further feature relates to a novel system for tele-tutorial instruction and the like whereby discrete animated visual programs con be transmitted under control of a novel record web or film which includes multi-sectored motion picture frames and associated multi-track sound records, which together comprise a teaching sequence. Each sound track is allotted to a respective series of similarly located sectors in successive frames, and in conjunction with means to transmit and receive the visual programs on a multi-sectored picture tube screen, while receiving the respective accompanying sound programs on a multiplexed frequency modulation carrier. By means of a series of selector members a student or any other person can select any one of the desired sectors of the picture tube for animated visual display while simultaneously selecting the correlated audio program.

A further feature relates to a visual display device of the cathode ray tube kind for receiving video signals in conjunction with sector blanking means whereby a viewer can select for display any desired sector of the screen upon which a respective video program is to be displayed.

A further feature relates to a novel web or film comprising multi-track sound recordings and associated motion picture frames with each frame carrying respective and discrete visual programs each allotted to a corresponding sound track.

A still further feature relates to the novel organization, arrangement and relative location and interconnection of parts which cooperate to provide an improved audio-visual display system which is particularly well adapted for self-tutoring or machine instruction systems.

Other features and advantages not specifically enumerated will be apparent after a consideration of the following detailed descriptions, the attached drawing and the appended claims.

In the drawing,

FIG. 4 is a schematic block and perspective diagram of a modification of the invention;

FIG. 5 is a highly magnified plan view of a part of a composite picture-sound film, using magnetic sound tracks and canted sound pick-up heads;

FIG. 6 is a schematic block diagram of a further modification of the invention;

FIG. 6A is a plan view of part of the novel sectored-frame motion picture film used in the system of FIG. 6.

Figure 1:
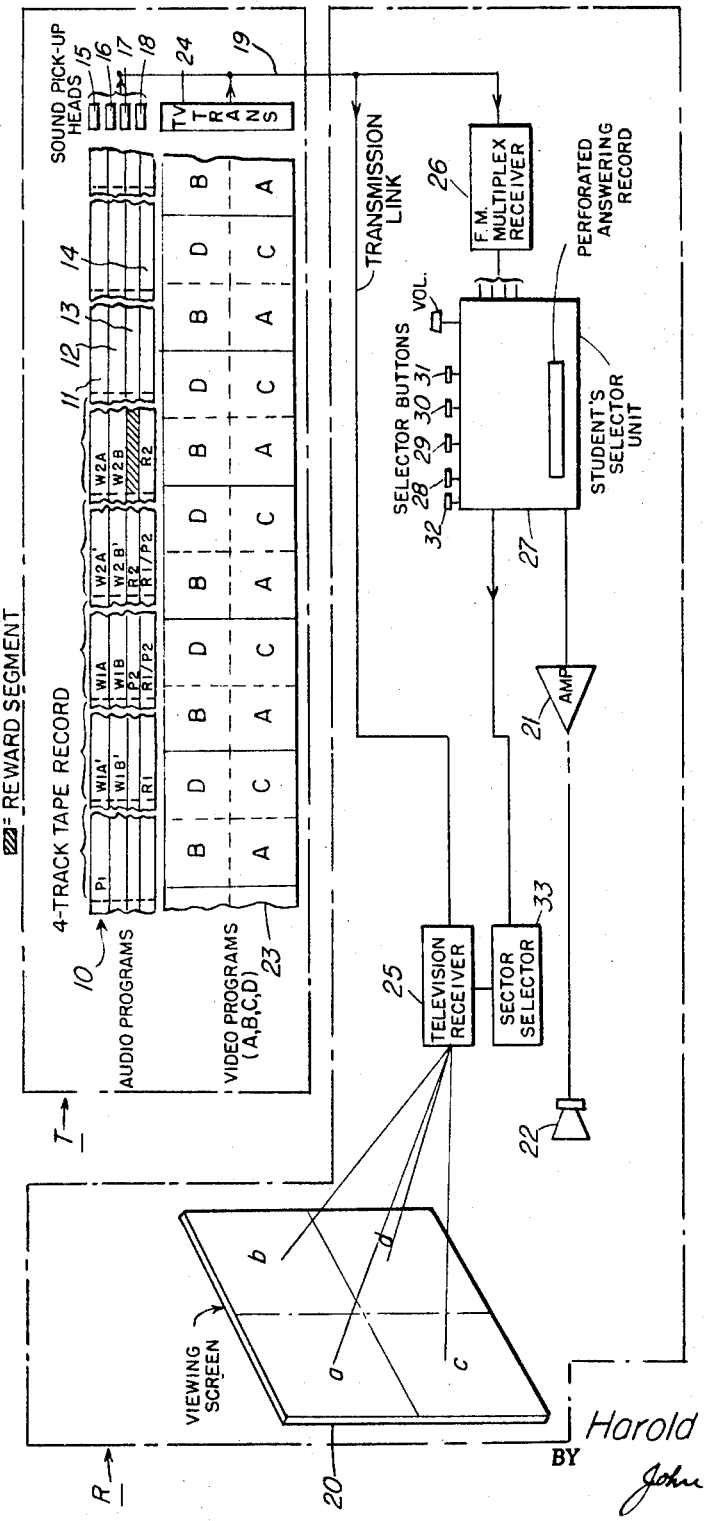
FIG. 1 is a composite schematic diagram of a system embodying the invention.

Merely for purposes of explaining the inventive concept, it will be described in connection with the so-called self-tutoring system such as disclosed in said application Serial No. 330,142. The system of said application employs a multi-track sound recording tape which is represented in FIG. 1 by the numeral 10. Typically the tape 10 may be any well-known magnetic tape having for example, four sound track 11–14 and respective pick-up or transducer heads 15–18. Any well-known mechanism may be employed for moving the tape past the heads to produce respective audio-frequency electrical signals which can be transmitted over any suitable transmission link 19, whether wire or wireless, and thence to a reproducing terminal which includes a switch controlled program-selecting and display arrangement. This display arrangement may include a visual displaying screen 20 of any kind such for example as a motion picture screen or the viewing screen of any well-known television picture tube and the like. The display arrangement also includes an audio-frequency amplifier 21 and associated sound reproducer 22.

In accordance with one aspect of the invention, the screen 20 may be considered as divided into four equal display sectors $a$, $b$, $c$, $d$, upon each of which is to be displayed any one of four discrete visual programs each of which is correlated with a corresponding audio program previously recorded in a corresponding one of the sound tracks 11–14. In accordance with another aspect of the invention the discrete visual programs are contained, for example, in a motion picture film 23 which has the usual sprocket holes and is provided with any well-known film feeding mechanism such as conventionally used in motion picture machines. Film 23 may be of any standard size such for example as 35 mm. film with successive standard frames through its length. However, in accordance with the invention each frame is subdivided into a series of sectors, for example, four sectors designated A, B, C, D. The corresponding sectors A in all successive frames have a respective complete visual program recorded therein. Likewise, the corresponding sectors B in the successive frames have a different visual program recorded therein; and similarly for the sectors C, D in the successive frames. Thus the visual program recorded in sectors A may be those accompanying and synchronized in time with the audio program in track 11; the visual programs in sectors B will then accompany and be synchronized with the audio programs in track 12; and similarly for the visual programs in sectors C and D.

The motion picture film 23 can be passed through any well-known television and scanning and transmitting mechansm 24 for translating the shade values of the elemental areas of the picture film into corresponding video signals for transmission in the manner well-known in the televisition scanning and transmission art. These video signals after suitable amplification can be transmitted over the transmission link 19 to accompany the audio signals from the devices 15–18. For example, the audio signals from devices 15–18 and device 24 may be modulated on respectively different carrier frequencies for application to the link 19. Preferably, although not necesarily, the audio frequency programs may be transmitted over the link 19 in the form of a multiplexed FM carrier. Thus the signals from device 15 may be in the form of 15–30 kc. modulations of an FM carrier of for example 100 megacycles; the signals from device 16 may be 30–45 kc. modulations of the said carrier; the signals from device 17 may be 45–60 kc. modulations of the FM carrier; and the signals from device 18 may be 60–75 kc. modulations of the FM carrier, all of which will be explained hereinbelow in connection with FIG. 2. The video signals from device 24 may be amplitude modulations of any standard television carrier frequency.

At the receiving end of link 19 the video signals are detected and amplified in any well-known television receiver 25, while the 4-channel FM signals are received, detected and amplified in the manner well-known in an FM multiplex receiver. As a result, the detected multiplex signals are separated into respective signal channels by respective filters as will be described in connection with FIG. 2. Associated with the detected multiplex signals is a selective device 27 having a set of five manually operable switches 28–32 and a volume control switch "VOL." Also associated with selector 27 is a sector selector 33 which selects the particular sector, a, b, c, d of the screen 20 on which the selected visual program is to be displayed. In the particular embodiment shown, the screen 20 may be the viewing screen of the cathode ray picture tube which forms part of the television receiver 25. The circuits for the selector 33 are shown in detail in FIG. 3 of the drawing and will be described hereinbelow.

Ordinarily, and in the absence of the sector selector 33, and the televisually transmitted frames of the motion picture film 23 would be displayed on the screen 20 so that all four visual programs would appear on the screen simultaneously in their respective sectors a, b, c, d. By means of the device 27 and the selector 33, three of the four sectors of the screen are blanked off depending upon which of the buttons 28–31 is operated. For example button 28 may be alloted to sound track 11 and the accompanying visual program which has been recorded in frame sectors A of film 23. Buttons 29 may be allotted to sound track 12 and to motion picture frame sectors B; button 30 may be allotted to sound track 13 and frame sectors C; while button 31 may be allotted to sound track 14 and frame sectors D. The purpose of button 32 is to be able to cut-out the sector blanker or selector, so that, if and when a non-sectored or conventional sequence of full frames appears before the scanner of the television transmitter 24, they are reproduced in full frame form, i.e. non-sectored on screen 20. The detailed description of this function of button 32 will be described in connection with FIGS. 3 and 5.

Thus, by operating any one of the four buttons 28–31, any particular sound track and its accompanying visual program received from link 19 can be selected whereby the audio signals of the selected program are reproduced by device 22, and the correlated accompanying visual program is displayed only on the appropriate sector of screen 20. A detailed description of the devices 27–33 will be given hereinbelow in connection with FIG. 2. Preferably, although not necessarily, the tape 10 is of the kind described in detail in application Serial No. 330,142 to which reference can be had for the manner of programming of the various segments of that tape, these segments being indicated in FIG. 1 by the legends P1, W1A, W1A', W1B, W1B', etc.

Let it be assumed that the system of FIG. 1 is to be used for self-tutoring wherein instructional information is to be disseminated from the transmission end or station T to a number of students' receiving stations similar to station R. The tape 10 contains in each of its tracks 11–14 a series of successive segments which have been pre-recorded with programmed information. For example, segment P1 may include a recording of an instructional statement or series of facts pertaining to a given problem follower by comments or instructions to the student giving him a set of four possible answer choices, each choice being represented by operation of respective buttons 28–31. As explained in said prior application Serial No. 330,142, the recording of the problem P1 of course does not give the student the correct answer when played back but it does give the student a choice of a number of possible answers. For example, the student may be informed in the playback of problem P1 that if he believes answer No. 1 to be correct to press, for example, button 28. After the student has heard the statement of the problem the remaining length of the P1 sector may be blank for a sufficient length of time to give the student an opportunity to considere which button to operate. If the student operates button 31 after sector P1 has been played back, it connects the head 18 in the circuit which causes the scanning of the next segment label R1. This segment may have prerecorded therein a statement confirming that the selected answer is correct and may contain additional encouraging or reinforcing information for the student together a command or instruction to operate for example button 31 again so as to receive the statement of the next problem which is recorded in segment R1/P2. Thereupon this second problem is played back to the student and he is again given a choice of a number of possible answers. For a detailed description of the manner in which the segments may be pre-recorded in the tape 10 reference may be had to said application Serial No. 330,142. It will be understood that the invention is not limited to any particular kind or sequence of instructional or directive information tha may be recorded in the segments, so long as it represents any known method of tutoring, e.g. by question and answers, by situations or problems and choices of answers or solutions thereto.

As will be explained hereinbelow in connection with FIG. 2 the operation of any of the buttons 28–31 causes the device 33 automatically to blank off three out of the four sectors of the picture tube screen 20, thus enabling the proper visual program to be displayed on screen 20 corresponding to the particular sound track that has been selected by the button operation. Thus the student is enabled to receive audible instructional and correctional or supplemental and at the same time to receive animated or other accompanying visual instructional of correctional or supplemental material which may include of course, pictures of the original instructor who recorded the programmed material on tape 10, manipulations of apparatus, etc .

In the foregoing it will be understood, of course, that the tape 10 and the film 23 are moved by their respective transport means in synchronized timed relation so that the moving picture frames are scanned in the proper correlation with the scanning of the corresponding segments in the sound tracks as is well-known in the sound-on-film arts. In one form of the invention the film 10 carrying the sound tracks and the film 23 carrying the motion picture frames constitute a single web as will be described hereinbelow in connection with FIG. 4.

Figure 2:
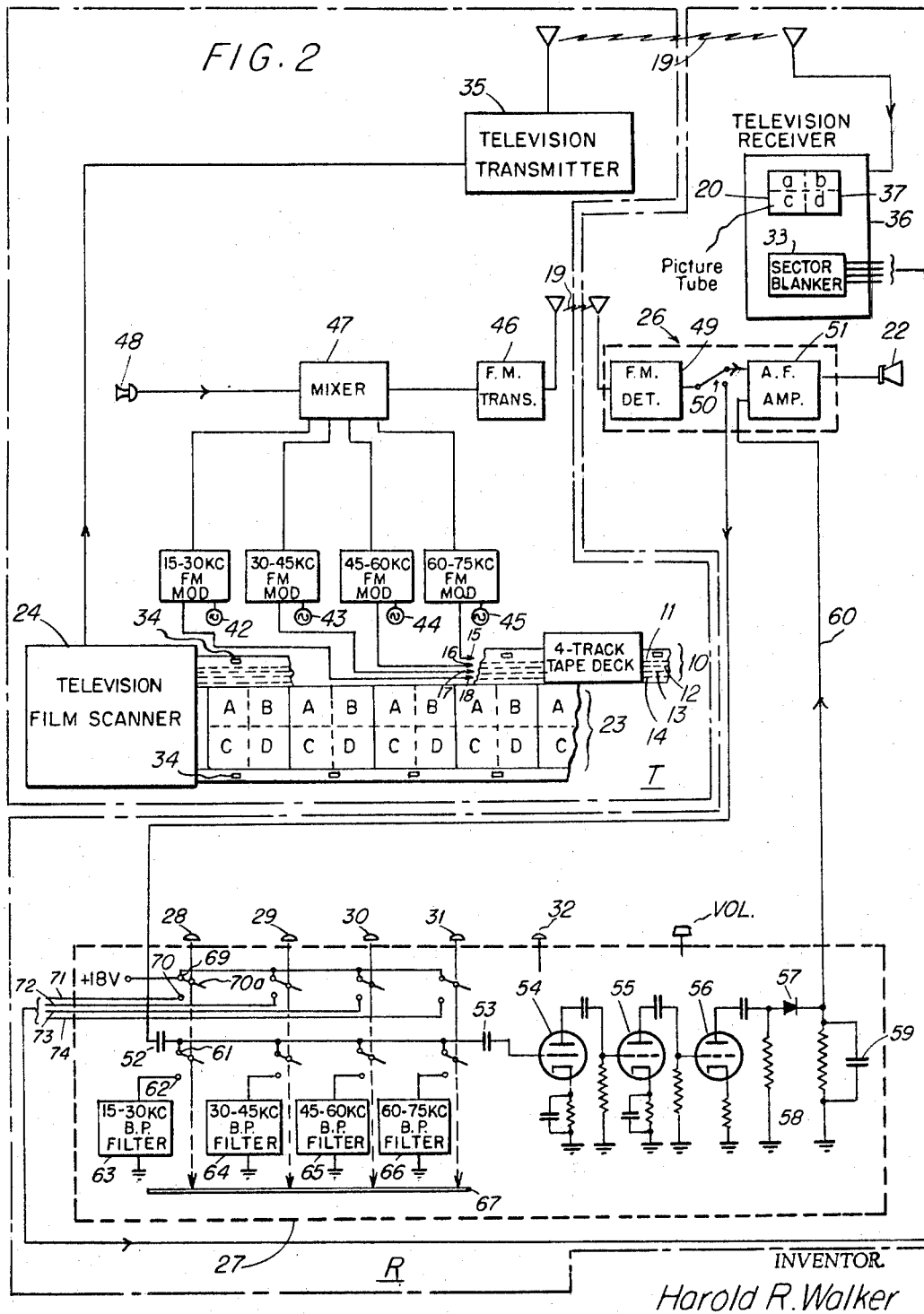
FIG. 2 is a more detailed schematic diagram of FIG. 1.
Figure 3:
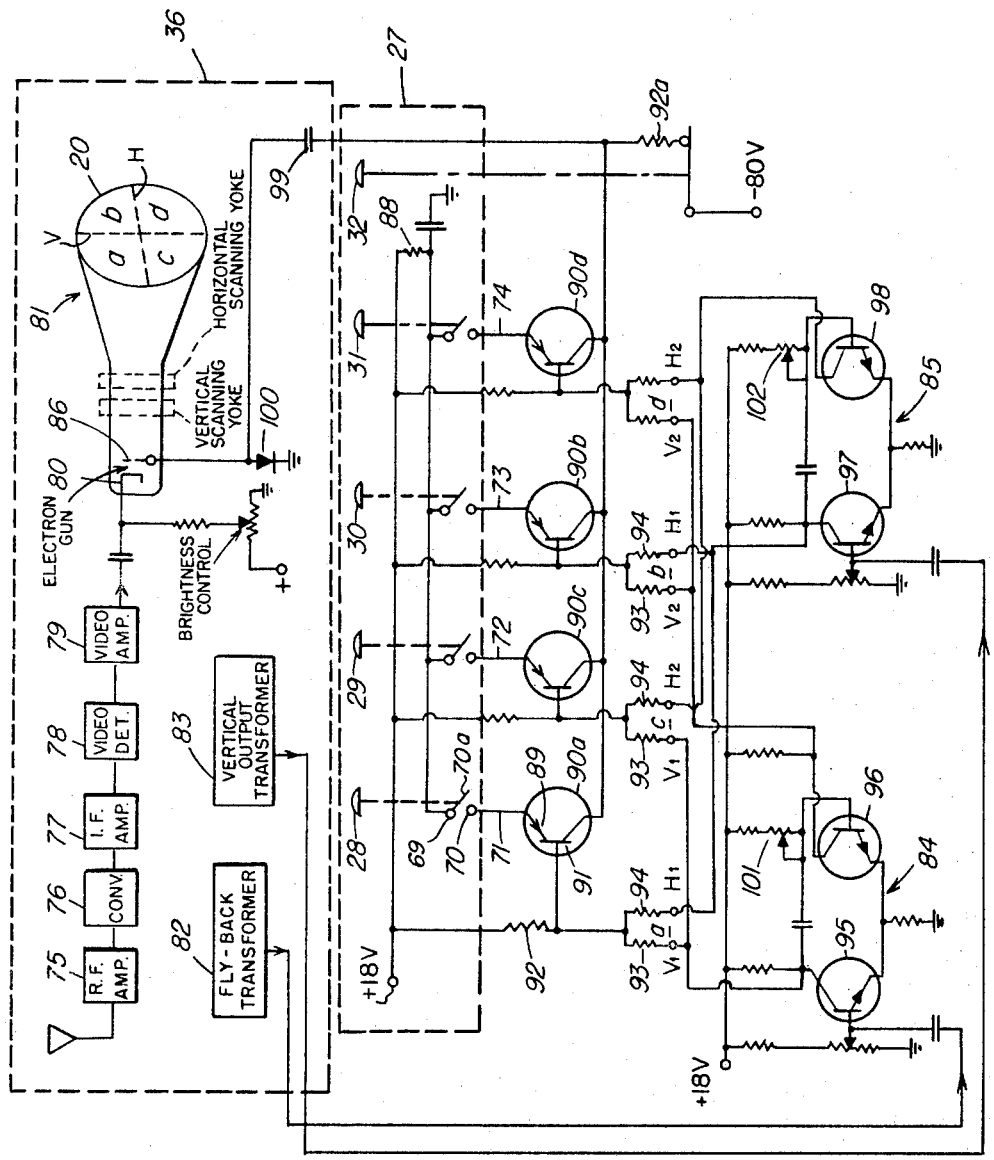
FIG. 3 is a detailed schematic block and wiring diagram of the television receiver and sector selector arrangement of FIGS. 1 and 2.

Referring to FIGS. 2 and 3, a description will now be given of a complete system such as is schematically shown in FIG. 1. The parts of FIGS. 2 and 3 which are functionally the same as those of FIG. 1 bear the same designation numerals. The web containing the sound tracks 11–14 and the motion picture frames A, B, C, D, etc. may for example be a standard 35 mm. film wherein the sound tracks are carried on one margin of the film and the frames A, B, C, D are on the remaining portion of the film, it being understood that the dimensions of the sound tracks in FIG. 1 and the remaining figures, are greatly exaggerated for purposes of clarity in the drawing. For example, the total width of the four tracks may be about ¼ of an inch and the balance of the non-sprocketed portion of the film may be occupied by the motion picture frames. The sound tracks 11–14 may be of the magnetic strip kind which can be formed or attached to the margin of the film by any known process. Alternatively the sound tracks may be of the photographic density striation kind such as is well-known in the sound-on-film art. The composite sound and picture film can then be fed through any well-known television film scanner 24 and the sound portion of the film can be passed through any well-known multi-track sound head. The translated video currents from scanner 24 are applied to modulate a suitable television frequency carrier forming part of any well-known television transmitter 35. These television signals are transmitted over the link 19 and are received at the receiving station R which includes the television receiver 36 having a cathode ray picture tube 37 (see FIG. 2) whose viewing screen is divided into four sectors a, b, c, d. The television receiver either has included therein, or as a separate accessory, the sector blanker or selector 33. Each receiving station R also has a frequency modulation radio receiver 26 of any known design in conjunction with the plural button selector unit 27. Thus the listener can receive the various items of information such as problems P1, P2, etc. recorded in the sound tracks of the original tape at the transmitter and he can make any choice of answer or response by operating any one of the buttons 28–31.

Each of the transducing heads 15–18 may be connected at station T to a respective FM modulator of any known design. Associated with each modulator is an oscillator 42–45 for generating a base of center frequency which can be modulated or shifted in accordance with the audio signals from the respective playback head. Typical modulating frequencies for the four multiplex signals are indicated as 15–30 kc., 30–45 kc., 45–60 kc., and 60–75 kc. These modulation frequencies are then used as sub-carriers to modulate the main FM radio carrier which forms part of any well-known FM transmitter 46. The modulated sub-carriers are fed to transmitter 46 through any well-known mixer network 47 which can also be supplied with audio signals, for example in the range of 0–15 kc. arising from the separate sound source such as microphone 48. Preferably the modulation index of the four sub-carriers is kept at such a level that all sideband energy is confined to the first harmonic of the modulation signals from the sources 15–18.

Thus there is broadcast from the transmitter 46 a main radio frequency carrier which is multiplexed in four channels corresponding to the signals from the four sound tracks and also in a fifth channel representing the signals from microphone 48. These multiplexed signals are picked up by the FM receiver 26 whose detector stage 49 is connected through a two-position switch 50. In one position of that switch the signals from source 48 are connected to the audio frequency amplifier 51 of the receiver and thence to the sound reproducer 22. This enables the listener to receive the standard broadcast from the transmitter arising from source 48.

In its other position, switch 50 connects detector 49 through capacitors 52, 53 to the input stage of another FM detector system comprising for example the grid-controlled tubes 54–56 and diode 57. These elements, which alternatively may be transistors, are arranged to constitute in the well-known manner a so-called "counter type" FM detector whereby the sinusoidal input waves applied through switch 50 are limited and clipped to convert them into square shaped waves at the output of tube 56. Each of these square waves is differentiated to produce a pulse, and by means of diode 57 and the associated R–C integrating network 58, 59, only the positive spikes of the square waves are passed and integrated to form a voltage wave form which closely resembles the audio frequency envelope of the respective signals from heads 15–18.

In order that only one of the four detected sub-carriers alone can produce an output on conductor 60, each of the selector buttons 28–31 is connected through its normally open switch contacts 61, 62 to a respective band pass filter 63–66. The filter 63 passes only the band 15–30 kc.; filter 64 passes only the band 30–45 kc.; filter 65 passes only the band 45–60 kc., and filter 66 passes only the band 60–75 kc. These filters can be designed so when any one of the buttons 28–31 is operated it produces for example a 10 decibel level rise between the particular sub-carrier frequency that has been selected, and the remaining sub-carrier frequencies. Since it is a well-known characteristic of a frequency modulated detector to respond only to the strongest input, the selection of one particular sub-carrier practically eliminates the existence of cross-talk between that sub-carrier output and the remaining sub-carriers. Thus the operation of any of the buttons 28–31 will cause the playback through reproducer 22 of the various segments in the corresponding selected track 15–18. At the same time, the operation of each button causes the recording card or web 67 to be perforated by the associated point 68, each of which is mechanically connected to a corresponding one of the buttons. Since the listener has no control over the starting and stopping of the tape at the transmitter he must be advised in advance in any suitable way to turn his receiver 26 to the particular broadcast station on which the multiplex information is being broadcast and to tune the television receiver 36 to the corresponding television channel. At the same time he operates switch 50 to connect the unit 27 into circuit with amplifier 51 and sound reproducer 22. As soon as the transmission begins, head 15 at the transmitter T scans the appropriate segment such as P1 as hereinabove described and the student hears in the reproducer 22 a statement of that particular factual problem, and after the statement of the problem he is given a choice of buttons to be operated as hereinabove described. A blank portion of the segment P1 is then scanned for example for a period of five to ten seconds to give the student time to consider his answer and make his choice of button operation. If for example he operates button 28 he hears the information in segment W1A' (see FIG. 1) telling him his choice is wrong and giving him further information and a second button choice. If he now selects button 29 he hears segment W1B again informing him his answer choice is wrong and instructing him to operate button 31. He then hears segment R1/P2 which gives him the statement of correct answer followed by the statement of the next problem P2. At the same time he operates a chosen button he perforates the card or web 67 to identify and record his answer.

Each of the buttons 28–31 has an additional set of normally open contacts 69, 70 and respective switch arm 70a. The contact 69 is connected to a suitable biasing potential such as +18 volts (see FIGS. 2 and 3). The other contact 70 of this set is connected to a respective one of the four conductors 71–74 which lead to the sector blanker 33 associated with the television receiver 36.

Referring to FIG. 3, it will be seen that the television receiver 36 includes the usual RF amplifier 75, converter 76, IF amplifier 77, video detector 78 and an amplifier 79 whose output drives the cathode 80 of the cathode ray picture tube 81 which has the usual phosphor picture screen 20. The usual brightness, centering, contrast and focusing controls (not shown) may be provided for the receiver as well as the usual horizontal and vertical deflection yokes. As is well known, the television receiver includes the usual flyback transformer 82 which produces a pulse at the end of each scanned line. Likewise the television receiver includes a vertical output transformer 83 which produces a pulse at the end of each vertical trace. Ordinarily, the television receiver would produce a visual, simultaneous display which would cover all four of the sectors a, b, c, d corresponding to the transmitted signals representing the four programs corresponding to the sectors A, B, C, D in the original motion picture film.

In order to blank out three of these four sectors on screen 20 so that only one program is visible at a time, there are provided a pair of one-shot multivibrators 84, 85 which are interconnected with the flyback transformer 82 and vertical output transformer 83 so that they bias the control grid 86 to beam cut-off when the beam is scanning the undesired sectors of the screen.

For that purpose the contact 69 of each button when closed on its associated contact 70 connects a +18 volt bias through resistor 88 to the emitters 89 of the corresponding switching transistors 90a–90d. The base 91 of each transistor is connected through a resistor 92 to the +18 volt point. The collector of each transistor 90a–90d is connected through resistor 92A to −80 v. bias through the normally closed contacts of a switch which is operated by button 32. Each base 91 is connected in parallel through respective resistors 93, 94 to which the output points V1–H1, V1–H2, V2–H1, V2–H2 of the multivibrators 84, 85 are connected, the interconnection being in combinations so that it requires a transistor in each of the multivibrators to be in the on condition before driving the associated switching transistors 90a–90d to conductivity.

Each multivibrator may for example comprise a pair of transistors 95, 96 and 97, 98 which are used for timing the conductivity of the transistor switches 90a–90d. Each pair of transistors is connected in the well-known manner to act as a one-shot multivibrator with the multivibrator 84 being triggered on by the pulses from the flyback transformer 82, and the multivibrator 85 being triggered on by the pulses from the vertical output transformer 83. In the well-known manner, when one transistor of each multivibrator is in the on state the other transistor thereof is in the off state. In other words, when transistors 95, 97 for example are on, the transistors 96, 98 are off and vice versa.

If it is assumed that transistors 95 and 97 are in the on condition they apply a driving voltage respectively to the points V1–H1 thus causing current to flow through resistors 93, 94 and driving the base 91 to switch the transistor 90a to conductivity. The change in potential at the base 91 causes a potential change at the collector of the transistor 90a, which is applied through the coupling condenser 99 to the control grid 86 to reduce its beam cut-off bias in association with the rectifier 100. This permits the beam to activate the sector a of the screen 20, it being assumed for purposes of explanation that the beam is scanning the screen 20 from left to right for horizontal scanning, and from top to bottom for vertical scanning.

When the beam reaches the vertical center line V the timing of the multivibrator 84 is such that the grid 86 again biased to beam cut-off since at this instant transistor 95 is in the off condition and the transistor 96 is in the on condition. Each of the multivibrators is provided with an adjustable rheostat 101, 102 by means of which the timing of the multivibrator can be controlled. In other words, the rheostat 101 can be set so that the associated multivibrator switches the transistor 96 to the on condition when the beam reaches the vertical center line V. Likewise the rheostat 102 for the multivibrator 85 is adjusted so that the transistor 98 is in the on condition when the beam reaches the center horizontal line H during the vertical scan. In other words, if switch 28 had been operated only the sector a of the screen 20 would be illuminated by the video signals as the beam is executing its complete screen scanning motion.

If on the other hand, button 30 had been operated, current would flow in parallel through the resistors 93, 94 associated with transistor 90b and would switch only that transistor on. The result is that only the b sector of the screen 20 would be excited by the scanning beam. Similarly, if button 28 had been operated the transistors 95 and 98 would be in the on condition and only the transistor 90c would be switched on, thus causing only segment c to be excited by the scanning beam. Likewise, if button 31 had been operated, the transistors 96 and 98 would be on and only transistor 90d would be switched on so that only sector d would be excited by the scanning beam. To summarize, in order for any one of the switching transistors 90a–90d to be in the on condition it is necessary that the associated multivibrator transistors be in the on condition as represented by the combinations respectively V1–H1, V2–H1, V1–H2, V2–H2. From the foregoing it will be seen that the student by selectively operating one of the buttons 28–31, hears the appropriate sound program and its accompanying motion picture program, and the button selection is recorded on the member 67 from which the student's score can be later evaluated.

As hereinabove pointed out, it may be desirable to receive and reproduce a complete motion picture frame on the screen of the picture tube 81, that is an unsectored frame. For that purpose the button 32 when operated disconnects the minus 80 volt potential of the power supply from the collectors of transistors 90a–90d. As a result of this loss of collector potential, the sector switching transistors cause the potential of grid 86 to rise to an average potential set by the diode 100 and the leakage of the transistor base-to-collector junctions, and the CRT is turned on all the time since the grid is thus raised to zero volts.

In the foregoing the invention has been described in connection with what may be called a tele-tutorial system, using a wire or wireless transmission link between the master composite record and the student's control and audio-visual devices. The invention is equally well applicable to what may be termed private or local tutoring. Thus as shown in FIG. 4 the student can be provided with a motion picture projector of any known kind which can be loaded with a reel of the composite plural sound track and plural visual program film. The film has the sectored picture frames and the plural sound tracks 11–14 hereinabove described. The sound head portion of the machine includes the several sound pick-up devices 15–18 and a suitable audio amplifier. The composite film is moved in the usual step-by-step manner to present the picture frames to the optical projection system, while the sound pick-up is effected at the portion of the film movement where the motion is continuous as is well-known in machines of the picture and sound kind. The projection system includes the usual projection lamp 103 and an associated optical system which is schematically represented by the lens 104 whereby each successive four-sector frame is imaged on an opaque disc 105 which disc forms part of the sector selector 33. Disc 105 has a set of five rectangular windows 106–110, arranged at each of five equal angular settings of the disc, and suitably fastened over each window is a respective refracting prism 111–115. Each prism thickness is tapered in a vertical direction and the prisms are turned through a 45° angle so that when disc 105 is rotated to bring any of the four windows 106–109 into optical alignment with the lens system, the image of the corresponding sector of a frame is refracted in mutually perpendicular directions so that it is projected on the central portion of the viewing screen 116. A suitable projecting lens system represented by numeral 104A may be used to project the image on the entire area of screen 116. Under certain circumstances as will be described hereinbelow in connection with FIGS. 6 and 6A, the film 23 may have at various parts of its length unsectored or standard frames so that such frames can be projected in their entirety on screen 116 at the appropriate periods of time. For that purpose the window 110 and its prism 115 are large enough to cover an entire frame. Thus when disc 105 is positioned to bring window 110 into registry with the optical system 104, each entire unsectored frame is projected on screen 116.

It will be observed that the sector selection windows and prisms are arranged in disc 105 so that when the disc is moved to a given one of its five positions, for example in position #3 shown in FIG. 4, the sector A is imaged through window 106 and prism 111, and thence on to screen 116. When the disc is turned to position #2, the window 108 and prism 113 are in optical registry with sector B. When the disc is turned to position #4, the window 107 and prism 112 are in optical alignment with sector C, and in position #1 window 109 and prism 114 are in alignment with sector D. Likewise when the disc is turned to position #5, the window 110 and prism 115 are in optical registry with the entire frame. Thus by positioning disc in any one of its four equiangular positions 1 to 4 it is possible to project any desired one of the four sectors of a frame, on to the central part of screen 116. On the other hand when the disc 105 is in position #5 the entire frame is projected on screen 116.

To enable the student to select what he considers to be the correct sound track and its accompanying motion picture program, he is provided with the selector unit 27 having the five selector buttons 28–32. The operation of any of those buttons automatically connects the amplifier 21 and sound reproducer 22 in circuit with the selected transducing head 15–18 in the manner described in detail in said application Serial No. 330,142.

Each of the buttons 28–32 also controls the circuit of any well-known precision shaft positioning mechanism 117 whereby the operation of any one of the five buttons automatically positions the shaft 118 of disc 105 in a corresponding one of its five positions hereinabove mentioned. It will be understood, of course, that any well-known shaft positioning mechanism may be employed. In fact, if desired, the buttons 28–32 may be mechanically linked to the shaft 118 for example through respective racks and pinions (not shown) for positioning the disc 105 in one of its five positions depending upon which button is operated. Preferably, however, the positioning of the disc 105 is controlled electrically, for example by any well-known servo motor mechanism controlled from the buttons 28–32. Thus there is schematically illustrated in FIG. 4 an electric motor 119 which turns the shaft 118 and this motor may form part of a so-called finder switch whose finding brush 120 is driven by the motor 119 and is provided with a set of five stationary contacts each of which is connected through a respective conductor of a five wire cable 121 to the control unit 27. Each of the buttons may be provided with a grounding contact 122 so that when it is operated as hereinabove described to select the appropriate sound track, it electrically marks the corresponding stationary contact in the seeking switch to close the circuit of motor 119. When the switch finds the grounded contact, the shaft 118 is stopped and centered with the proper prism of disc 105 in alignment with the corresponding frame sector or in alignment with the corresponding full frame of the film 23. Since such finder switches are well-known, detail description is not required herein. As described in detail in said application Serial No. 330,142, each of the buttons is also provided with additional contacts so that when operated, it connects the audio-amplifier 21 in circuit with a corresponding one of the four conductors in cable 123 and thence to the corresponding one of the four sound heads in the sound head pick-up and amplifier H. Thus, by pressing any one of the buttons 28–31 the appropriate sector in the successive motion picture frames are selected for projection on the screen 116 and likewise the corresponding sound head is connected in circuit. As stated hereinabove the film 23 may have at various parts of its length full frames as distinguished from sectored frames. In that case the operation of button 32 causes the projection of the full frames on the screen 116. Button 32 has its sound head selecting contact multiplied for example to one of the conductors in the cable 123. For example it may be multiplied to the particular conductor which leads to the sound head pick-up unit corresponding to track 11 in the film. This track will have recorded therein appropriate sound programs accompanying the full frame visual programs allotted thereto.

In its preferred form the motion of the composite film 10–23 is under control of the student as described in said application Serial No. 330,142. For that purpose the motor 124 which drives the composite film is connected to the film drive shaft through a solenoid control clutch 125. This clutch has an associated solenoid 126 whose circuit is under control of the buttons 28–32. The solenoid 126 is connected to the student's control unit 27 as described in detail in said application Serial No. 330,142. The unit 27 also includes a motor control relay 127 which when operated opens the circuit of solenoid 126 and immediately stops the film movement. As explained in said application Serial No. 330,142, each of the segments in the various sound tracks 11–14 has at the end portion thereof a specially recorded signal or absence of signal so that when that part of the segment is being scanned by the respective pick-up head it causes the relay 127 to be operated, or released as the case may be, to stop the film movement. Whenever the student operates one of the buttons 28–32 the relay 127 responds and recloses the solenoid circuit to restart the film movement. Thus the stopping of the film is under control of an appropriate control signal recorded at the end of each sound track segment, and the starting of the film movement is controlled by the student.

As hereinabove pointed out the sound in the various sound tracks can be of any well-known kind. If these sound tracks are of the magnetic kind, because of the relatively narrow width of the film available for the tracks, a special disposition of the respective pick-up heads and the program sound recordings may be used. Thus as shown in FIG. 5 only two physical track widths for four distinct sound programs are required. The recordings for one sound program are superposed on the recordings for another sound program, but with the orientation of the striations for the two programs at right angles to each other. Thus the striations 128a for one sound program will have been recorded at right angles to the striations 128b for another sound program. The pick-up heads 15–18 are likewise oriented at right angles so that the magnetic pick-up gap 129a for head 15 is oriented with the striations 128a, whereas gap 129b is oriented only with the striations 128b. Likewise the pick-up gap 129c is oriented with the striations 128c and pick-up gap 129d is oriented with striations 128d. Thus any given pick-up head responds only to one particular recorded sound program in its corresponding track. Thus the selection of any playback head enables only one of the corresponding sound programs to be selectively played back.

FIG. 6 shows a modification of the system of FIG. 2 wherein the television transmitter for example may be located in a different studio from the FM transmitter and the FM transmission is to be synchronized in time with the television transmission. The parts of FIG. 6 which correspond to FIG. 2 bear the same designation numerals. In this embodiment the four-track tape deck is located at the FM studio while the television film scanner 24 is located at the television studio. The four-track sound recording tape 10 is thus a distinct element from the motion picture film 23 and it becomes necessary to synchronize the beginning and ending of the sound transmissions with the picture transmissions. For that purpose the drive motor 130 for the sound tape is coupled to the tape transporting mechanism through a solenoid control clutch 131. The solenoid 132 has its circuit controlled by a control relay 133. 133 is connected in circuit with a sound head which scans the sound track portion of the motion picture film 23. Film 23 may be of the standard sound-on film type wherein a single sound track is provided adjacent the motion picture frames. At the beginning of the television transmission, the sound track on film 23 has recorded therein a distinctive frequency which is preferably either sub-audible or super-audible. Consequently when the film starts its movement through the television scanner, this distinctive sound signal is picked up by the sound head 134 and transmitted by land line or other means to the control relay 133. This relay then operates to close the circuit of solenoid 132 whereby the motor 130 starts driving the four-track tape 10. Thus the beginning of the FM multiplex transmissions from the FM transmitter 46 is synchronized in time with the beginning of the transmission of the corresponding pictures from the television transmitter 35.

At the end of each segment of program another distinctive signal is transmitted from the pick-up sound head 134 to the relay 133 causing the release of that relay and consequently stopping the movement of the tape 10. This stopping signal is of course recorded in the sound track on film 23 at the end of the appropriate program segment. If desired, a single distinct frequency signal may be recorded in the sound track on film 23 so that when it is picked up at the head 34 it maintains the relay 133 operated and thus maintains the tape 10 in transducing motion. At the end of the program segement the said distinct signal may be unrecorded in the sound track of film 23 thus causing the relay 133 to release and stop the motion of tape 10.

FIG. 6A shows a typical portion of the film 23 of FIG. 6. It comprises sectored frames A, B, C, D. One set of such frames may contain pictures constituting one visual program and are followed by blank or non-picture frames 135. So long as the sectored frames are being scanned and transmitted by television they are likewise reproduced in the sectored parts $a, b, c, d$ of the picture tube 37 of television receiver 36. When the first visual program has been transmitted and reproduced on the appropriate sector of the picture tube, the blank frames 135 are scanned and the picture tube becomes black or blank. The sound track for the sectored frames in film 23 has the distinct control signal 137 recorded therein just prior to the first blank frame 135, the direction of movement of the film 23 being indicated by the arrow. This causes stopping of the tape transport at the FM studio as hereinabove described. At the end of the blank frames, the motor start signal 138 is transduced and when picked up by the sound head 134 it causes the restarting of the tape transport at the FM studio.

The purpose of the blank frames is to give the student time to consider his answer or response to the problem or program just previously transmitted by television. During this blank picture period he operates what he believes to be the correct one of the buttons 28–31 which causes his sound reproducer 22 to reproduce the sound program in the corresponding selected track 11–14 and as transmitted from the FM studio.

It should be observed that the film 23 may have recorded thereon the usual single sound track. Located between the controls signals 137, 138 is a recorded statement pointing out the fact that the plural sector picture being transmitted by television is being transmitted for instructional or special purposes and requires accompanying sound programs and requiring a special multiplex radio receiver to receive the said programs. In other words, any viewer looking in on his conventional television set will see the four sector pictures A, B, C, D simultaneously but he will not receive the corresponding audio programs until he follows the instructions contained in record 136 which have been transmitted from the transmitter 35 in the usual way.

As explained hereinabove in connection with FIG. 2 the particular button which has been operated also results in the selection of the corresponding sector of screen 37. Here again, at some part of the film 23 there may have been recorded non-sectored or full picture frames 139. In that case, just before the appearance of such full frames one of the sound tracks, for example track 11 will have recorded therein a statement to the student that he is to operate button 32 which disables the sector selector or blanker 33. As a result the student sees the full picture frame 139 appearing on screen 37, and he also hears the corresponding sound program being transmitted from track 11.

While in the foregoing specification certain materials and apparatus have been referred to, the invention is not necessarily limited thereto. Likewise while the invention has been described in connection with a 4-track sound film, and corresponding multi-picture program film, the number of sound tracks and picture programs may be greater than or less than four. Furthermore while in FIGS. 1, 2 and 6 the composite signals are transmitted over a radio space communications link, it will be understood that the signals can be transmitted by a wire line using so-called multiplexed carrier frequencies in the super-audible range, or by any other equivalent multiplexed transmission method.

What is claimed is:

1. In a system for enabling a listener to receive and respond to transmitted programmed aural and visual programs, the combination of a plurality of sound program playback means each allotted to a corresponding recorded aural program, a plurality of manually operable members to select any playback means, a web carrying a series of sound tracks one for each of said aural programs, each of said tracks having a series of segments, with certain segments containing playback recordings for providing the listener with a choice of operation of one out of said plurality of manually operable members, said web also including a series of motion picture frames with each frame divided into sectors so that the similar sectors in successive frames constitute a visual record of a visual program to accompany a corresponding aural program in a particular corresponding one of said sound tracks, control circuits responsive to the operation of any one of said members to automatically reproduce the aural program in the corresponding selected sound track and simultaneously to select the proper sector in said motion picture frames to visually display the same on its allotted sector area of said screen, said control circuits further including means for blanking the other sector areas of said screen to which the remaining motion picture frame sectors are allotted, and means including other track segments having recorded information therein for confirming to the listener the correctness or incorrectness of the choice he has made.

2. Audio-visual apparatus comprising a sound-on-film motion picture projector said projector, including a plural track sound head means for transducing corresponding sound programs on the film, a motor for driving said film, a film selector mask arranged to assume any one of a series of frame masking positions each in optical alignment with a corresponding portion of the motion picture film, a set of manually operable switches one for each sound head, means responsive to the operation of any switch to select the corresponding sound head for transducing of the corresponding sound track on said film and for simultaneously positioning said mask to select a portion for video reproduction, and additional means responsive to the operation of any such switch for controlling the starting and stopping of said motor.

3. Audio-visual apparatus according to claim 2 in which said selector mask has a series of masking apertures each of which is allotted to a coersponding sector of each motion picture frame.

4. An audio-visual transmission system comprising a television transmitter, a multiplex radio transmitter, a plural sound program record web, motor means to drive said web to transduce the recorded sound programs into corresponding audio frequency signals for transmission by said radio transmitter, a plural video program motion picture film at the television transmitter each such video program being allotted to a corresponding one of said sound programs, means at the television transmitter to transduce the video pragrams on the film into corresponding television video signals, means controlled by said film for synchronizing the starting and stopping of said motor means, a television receiver for reproducing on a viewing screen thereof the transduced video programs from said television transmitter and for reproducing the said sound programs from said radio transmitter, said television receiver including means for allotting different video programs to different respective sectors of said screen, manually operable selector means at the receiver for selecting any desired video program and its corresponding sound program, means controlled by said selector means for displaying the selected video program on its allotted sector of said screen, means for blanking the other sectors of said screen to which the remaining video programs are allotted, and means for confirming to the viewer the correctness or incorrectness of the selection he has made.

5. An audio-visual method which utilizes an information sequence including problems to be answered followed by a plurality of choices to be presented for selection by a listener in response to the problems presented, said method comprising the steps of
   providing different aural program components of said information sequence for transmission in different respective channels,
   providing different visual program components of said information sequence for transmission as different respective picture sectors with certain of said visual program components being information and time correlated with certain of said aural program components,
   generating signals representative of said aural program components,
   generating signal representative of said visual program components,
   transmitting said signals representative of said information sequence over a communication link to means for receiving the same,
   responding to said problems at the receiving means by actuating selector means to receive one of said aural program components as the listener-selected choice of the plurality of choices available,
   reproducing the selected aural program component for presentation to the listener,
   simultaneously automatically selecting with said selected aural program component a corresponding information and time correlated visual program component,
   displaying said selected correlated visual program component on an allotted sector of a screen provided for viewing by the listener,
   suppressing the display of all other visual program components from their respective allotted sectors on said screen,
   and confirming to the listener the correctness or incorrectness of his response.

6. An audio-visual method for the recording of teaching information utilizing an information sequence which includes problems to be answered, followed by a plurality of choices to be presented for selective retrieval by a listener in response to the problems presented, said method comprising the steps of
   prerecording different aural program components of said information sequence on different respective channels of a first plural-channel information storage means,
   prerecording different visual program components of said information sequence on different respective sectors of a second plural-channel information storage means with certain of said visual program components being information and time correlated with certain of said aural program components,
   generating signals representative of said aural program components,
   generating signals representative of said visual program components,
   transmitting said signals representative of said information sequence over a communication link to means for receiving the same,
   responding to said problems at the receiving means by actuating selector means to receive one of said aural program components as the listener-selected choice of the plurality of choices available,
   reproducing the selected aural program component for presentation to the listener,
   simultaneously automatically selecting with said selected aural program component a corresponding information and time correlated visual program component,
   displaying said selected correlated visual program component on an allotted sector of a screen provided for viewing by the listener,
   suppressing the display of all other visual program components from their respective allotted sectors on said screen,
   and confirming to the listener the correctness or incorrectness of his selection.

7. An audio-visual method for teaching by utilizing a teaching sequence which includes problems to be answered, followed by a plurality of choices to be presented for selection by a listener in response to the problems presented and information confirming the correctness or incorrectness of the responses, said method comprising the steps of
   prerecording different aural program components of said teaching sequence on different respective channels of a first plural-channel information storage means,
   prerecording different visual program components of said teaching sequence on different respective sectors of a second plural-channel information storage means with certain of said visual program components being information and time correlated with certain of said aural program components,
   generating signals representative of said aural program components,
   generating signals representative of said visual program components,
   transmitting said signals representative of said teaching sequence over a communication link to means for receiving the same,
   responding to said problems at the receiving means by actuating selector means to receive one of said aural program components as the listener-selected choice of the plurality of choices available,
   reproducing the selected aural program component for presentation to the listener,
   simultaneously automatically selecting with said selected aural program component a corresponding information and time correlated visual program component,
   displaying said selected correlated visual program component on an allotted sector of a screen provided for viewing by the listener,
   suppressing the display of all other visual program components from their respective allotted sectors on said screen,
   and confirming to the listener the correctness or incorrectness of his response, whereby the learning of said listener is reinforced.

8. An audio-visual method for teaching by broadcasting a step-by-step programmed instruction sequence which includes problems to be answered, followed by a plurality of choices to be presented for selection by a listener in response to the problems presented and information confirming the correctness or incorrectness of the responses, said method comprising the steps of
   prerecording different aural program components of said sequence on different respective tracks of a recording medium,
   prerecording different video program components of said sequence on different respective sectors of a plural frame information storage means with certain of said video program components being information and time correlated with certain of said aural program components, scanning said tracks to generate signals representative of said aural program components, scanning the sectors of said frames to generate signals representative of said video program components, transmitting said signals representative of said aural program components over a plural channel transmitter wherein a different transmitting channel is provided for the signals representing each respective aural program component, transmitting said signals representative of said video program components over a television transmitter, receiving said signals representative of both said aural program components and said video program components at receiving means therefor including a television receiver, responding to said problems at the receiving means by actuating selector means to receive one of said aural program components as the listener-selected choice of the plurality of choices available, reproducing the selected aural program component for presentation to the listener, simultaneously automatically selecting with said selected aural program component a corresponding information and time correlated video program component, displaying said selected correlated video program component on an allotted sector of the screen of said television receiver, suppressing the display of all other video program components from their respective allotted sectors on said television screen, and confirming to the listener the correctness or incorrectness of the choice he has made, whereby the learning of said listener is reinforced.

9. In an audio-visual system for teaching by broadcasting a step-by-step programmed instruction sequence which includes problems to be answered, followed by a plurality of choices to be presented for selection by a listener in response to the problems presented and information confirming the correctness or incorrectness of the responses, the method comprising the steps of receiving on a plural sub-carrier channel multiplex receiver signals representative of different aural program components of said instruction sequence, receiving on a television receiver signals representative of different picture frame sectors which are information and time correlated with certain of said aural program components, responding to said problems by actuating selector means to receive one of said aural program components as the listener-selected choice of the plurality of choices available, reproducing the selected aural program component for presentation to the listener, simultaneously automatically selecting with said selected aural program component a corresponding information and time correlated picture frame sector, displaying said selected correlated picture frame sector on an allotted sector of the screen of said television receiver, suppressing the display of all other picture frame sectors from their respective allotted sectors on said television screen, and confirming to the listener by aural or visual presentation the correctness or incorrectness of the choice he has made, whereby the learning of said listener is reinforced.

10. In an audio-visual system for teaching by broadcasting a step-by-step programmed instruction sequence which includes problems to be answered, followed by a plurality of choices to be presented for selection by a listener in response to the problems presented and information confirming the correctness or incorrectness of the responses, the combination comprising a receiver for receiving multiplex signals representative of different aural program components of said instruction sequence, a television receiver for receiving signals representative of different picture frame sectors which are information and time correlated with certain of said aural program components, selector means for selecting one of the choices presented, said selector means being coupled to said receiver for reproducing the selected aural program component for presentation to the listener, said selector means being also coupled to said television receiver for simultaneously automatically selecting with said selected aural program component a corresponding information and time correlated picture frame sector, a cathode ray tube in said television receiver having a screen for displaying visual information, means for displaying different picture frame sectors on predetermined sector areas of said screen, a sector blanking circuit connected to said cathode ray tube and also to said selector means, said sector blanking circuit having means therein for causing the display of said selected correlated picture frame sector on the sector area of said screen allotted thereto, said sector blanking circuit having further means therein for suppressing the display of all other picture frame sectors from their respective allotted sector areas on said screen, and means for confirming to the listener by aural or visual presentation the correctness or incorrectness of the choice he has made, whereby the learning of said listener is reinforced.

11. In an audio-visual system for teaching by broadcasting a step-by-step programmed instruction sequence which includes problems to be answered, followed by a plurality of choices to be presented for selection by a listener in response to the problems presented and information confirming the correctness or incorrectness of the responses, the combination comprising a plural channel multiplex receiver for receiving signals representative of different aural program components of said instruction sequence, a television receiver for receiving signals representative of different picture frame sectors which are information and time correlated with certain of said aural program components, selector means for selecting one of the choices presented, said selector means being coupled to said multiplex receiver for reproducing the selected aural program component for presentation to the listener, said selector means being also coupled to said television receiver for simultaneously automatically selecting with said selected aural program component a corresponding information and time correlated picture frame sector, a cathode ray tube in said television receiver having a screen for displaying visual information, horizontal and vertical scanning circuits coupled to said cathode ray tube, means for displaying different picture frame sectors on predetermined sector areas of said cathode ray tube screen, said latter means including a sector blanking circuit, said sector blanking circuit being connected to said selector means, said sector blanking circuit being further connected between said scanning circuits and the control grid of said cathode ray tube, said sector blanking circuit having means therein for causing the display of said selected correlated picture frame sector on the sector area of said screen allotted thereto, said sector blanking circuit having further means therein for suppressing the display of all other picture frame sectors from their respective allotted sector areas on said screen, and means for confirming to the listener by aural or visual presentation the correctness or incorrectness of the choice he has made, whereby the learning of said listener is reinforced.

12. The invention described in claim 11 wherein said sector blanking circuit includes a one-shot multivibrator connected to said horizontal scanning circuit and a one-shot multivibrator connected to said vertical scanning circuit, said sector blanking circuit further including a switching transistor for each visual information sector of any given picture frame, each of said transistors being connected to one of said multivibrators and responsive to pulses therefrom, each transistor also being coupled to the control grid of said cathode ray tube, and each of said transistors being further coupled to a respective sector selector switch provided for the different visual information sectors of any given picture frame, whereby selective display of the different picture frame sectors is achieved on their respective sector areas of said screen.

13. In an audio-visual system for teaching by broadcasting a step-by-step programmed instruction sequence which includes problems to be answered followed by a plurality of choices to be presented for selection by a listener in response to the problems presented and information confirming the correctness or incorrectness of the responses, the combination comprising means for generating signals representative of different aural program components of said instruction sequence, means for generating signals representative of different picture frame sectors of said instruction sequence which are information and time correlated with certain of said aural program components, a plural channel transmitter for transmitting said signals representative of said aural program components in different respective channels, a television transmitter for transmitting said signals representative of said different picture frame sectors, a plural channel receiver for receiving said signals representative of said different aural program components, a television receiver for receiving signals representative of said different picture frame sectors, selector means for selecting one of the choices presented, said selector means being coupled to said receiver for reproducing the selected aural program component for presentation to the listener, said selector means being also coupled to said television receiver for simultaneously automatically selecting with said selected aural program component a corresponding information and time correlated picture frame sector, a cathode ray tube in said television receiver having a screen for displaying visual information, means for displaying different picture frame sectors on predetermined sector areas of said screen, a sector blanking circuit connected to said cathode ray tube and also to said selector means, said sector blanking circuit having means therein for causing the display of said selected correlated picture frame sector on the sector area of said screen allotted thereto, said sector blanking circuit having further means therein for suppressing the display of all other picture frame sectors from their respective allotted sector areas on said screen, and means for confirming to the listener by aural or visual presentation the correctness or incorrectness of the choice he has made, whereby the learning of said listener is reinforced.

References Cited by the Examiner

UNITED STATES PATENTS

| 1,164,859 | 12/1915 | Pietzsch et al. | 35—9 |
| 3,008,000 | 11/1961 | Morchand | 35—9 |
| 3,141,243 | 7/1964 | Chapman et al. | 35—9 |
| 3,180,931 | 4/1965 | Morchand | 35—9 |

EUGENE R. CAPOZIO, *Primary Examiner.*

R. E. KLEIN, *Assistant Examiner.*